March 15, 1932. C. A. BRAIDWOOD 1,849,905
FISH LURE
Filed May 10, 1930
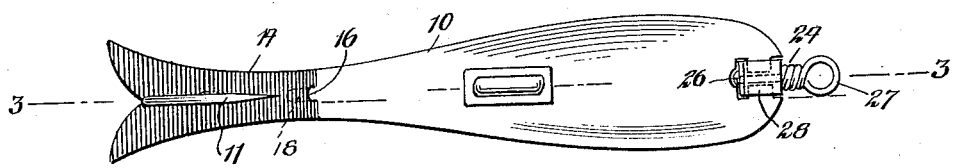
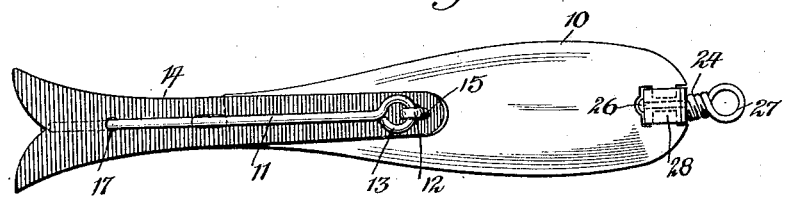
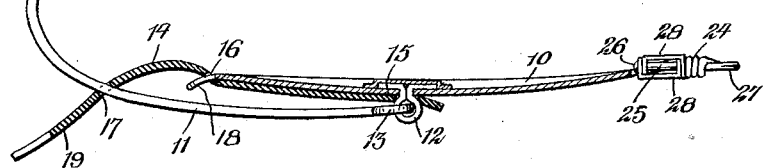
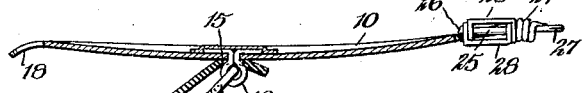
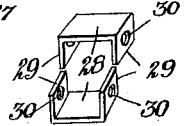
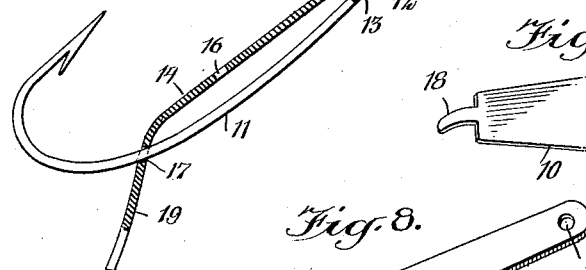
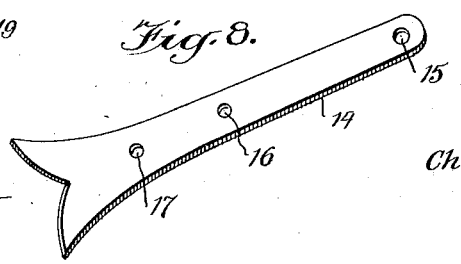
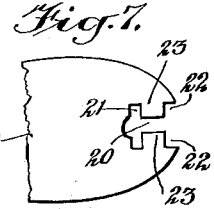
INVENTOR
Chester A. Braidwood
BY
ATTORNEYS.

Patented Mar. 15, 1932

1,849,905

UNITED STATES PATENT OFFICE

CHESTER A. BRAIDWOOD, OF PERTH AMBOY, NEW JERSEY

FISH LURE

Application filed May 10, 1930. Serial No. 451,462.

This invention relates to artificial fish bait, spoons or lures and their hooks, which are useful with trolling and casting rigs, and has especial reference to improvements in hook retaining and controlling means as connected with the lure or spoon, and also in the manner of effecting a swivel connection of a line with the lure or spoon.

An object of the invention is the provision of a simple and efficient means for controlling the action of swinging hooks or artificial bait or lures, to secure more effectual hooking and holding of a fish, and also to cause the bait or lure to wobble and thereby attract a fish.

Another object of the invention is to provide a lure or bait of the indicated character which when cast upon the water will have the hook thereof in striking position, and which will be released and swing free at the instant a fish is hooked.

Another object of the invention is the provision of a simple and efficient means for swivelly connecting a line with a lure or spoon, so that the swivel will set close to the same so as not to catch on weeds, and to allow a fishing line attached thereto to freely revolve without tangling itself.

The nature of the invention and its distinguishing features and advantages will appear when the following specification is read in connection with the accompanying drawings, in which Figure 1 is a top view of a lure embodying the invention;

Figure 2 is a bottom view of the lure;

Figure 3 is a section on the line 3—3 of Figure 1;

Figure 4 is a view similar to Figure 3 showing the hook released;

Figure 5 is a view of the rear end of the lure;

Figure 6 is a perspective view of parts of the swivel;

Figure 7 is a plan view of the forward end of the lure;

Figure 8 is a perspective view of the hook retaining member.

Referring now more particularly to the drawings, it will be apparent that there is shown a lure or spoon 10, which may be of any approved size and shape, and which, in the present instance, is made of polished metal to give metallic flash or luring effect. Other materials, such as painted wood, or pyroxylin, or a combination of these materials with metal, may be used. A hook 11 of suitable size is connected with the lure 10 at a point substantially midway between its ends, and this is accomplished by the use of an eye 12 secured to the lure 10 in any suitable manner, the said eye 12 being connected with the eye 13 on the hook 11. The hook 11 is thus connected with the lure 10 for swinging movement both laterally and up and down.

In order to retain the hook 11 up in striking position, as shown in Figure 3, also to retain a hook in this position when the lure is cast upon the water, and also to release the hook so that it will swing freely at the instant a fish is hooked, there is provided means presently to be described. Use is made of a piece of soft resilient or elastic material which is cut to the desired shape to form a retaining member 14, the same being fin-shaped in the present instance. The retaining member 14 is provided with a hole 15 in the forward end thereof, a hole 16 intermediate the ends thereof, and a hole 17 near the rear end thereof. The holes 15, 16 and 17 are in longitudinal alinement. The retaining member 14 is made preferably of high grade rubber. The rear end of the lure 10 is provided with a bendable projection 18, the same being integral with the lure 10. The projection 18 is curved rearwardly and downwardly. The retaining member 14 is applied by entering the barbed end of the hook through the hole 15 in the retaining member 14 and the latter is passed along the shank of the hook 11, and the forward end of the retaining member 14 is then stretched and engaged with the eye 12. The barbed end of the hook 11 is then entered in the hole 17 in the retaining member 14, and the latter is brought forward to a suitable point on the shank of the hook 11. It will be apparent that the rear end portion 19 of the retaining member 14 extends downwardly and rearwardly with respect to the shank of the hook 11. The retaining member 14 may then be engaged with the lure 10, and this is accomplished by entering the projection 18 in the hole 16 in the retaining member 14, as shown in Figure 3. The hook 11 may then be held up in a striking position with respect to the lure 10. The retaining member 14 together with the projection 18 serves to releasably retain the hook 11 in the striking position when the lure is cast upon the water, but will release the hook 11 to swing free at the instant a pull is exerted on the hook by a fish caught on the hook. When the hook 11 is up in the striking position, as shown in Figure 3, the retaining member 14 will cause the lure to wobble and so attract a fish when the lure is drawn through the water, and also allows the hook 11 to swing laterally with respect to the lure 10 to a limited degree. When the retaining member 14 becomes wet from being immersed in the water it will slip more readily from the projection 18 than when it is dry, as at the time of casting. It is to be understood that the projection 18, which is bendable, may be bent to the desired curvature so as to insure the proper release of the hook 11.

The lure 10 is also provided with a novel form of swivel for connecting a fish line with the forward end of the lure. The swivel connection consists in providing the forward end of the lure 10 with a longitudinal slot 20 which communicates with a transverse slot 21 and notches 22. By slotting and notching the lure 10 there are provided lugs 23 directly opposite each other in the plane of the lure. The swivel connection also includes a swivel member 24 made of a single piece of wire to provide a shank 25 having a head 26 on one end and an attaching eye 27 on the opposite end. Similar plates 28 are provided and each has laterally disposed ends 29 with alined holes 30 therein. The plates 28 are arranged on opposite sides of the lure adjacent said lugs 23, and the shank 25 of the swivel member 24 projects through the ends 29 of the plates 28. The transverse slot 21 and the notches 22 accommodate the ends 29 of the plates 28. It will therefore be apparent that the ends 29 of the plates 28 are engageable with the lugs 23 and prevent endwise movement of the plates with respect to the lure. The longitudinal slot 20 provides a clearance space for the shank 25 of the swivel member 24 thereby allowing the plates 28 to tilt a limited degree subject to engagement with the lugs 23. The swivel member 24 will be free to rotate at all times.

From the foregoing it will be apparent that a lure having the features set forth will be very effective when used in conjunction with trolling and casting rigs; that the hook will be kept in a striking position until released by a hooked fish; and that should the hook for any reason be released when casting the lure, the retaining member 14 of itself, under the action of the water, will bring the hook 11 up in a striking position.

Claims:

1. Artificial bait comprising the combination of a lure or spoon, a hook swingably connected with the lure or spoon, and means connected at one end with the lure or spoon and connected near its opposite end with the hook and releasably engaged with one extremity of the lure or spoon, to releasably retain the hook up in striking position and allowing the hook to have a limited amount of lateral play with respect to the lure or spoon.

2. Artificial bait comprising the combination of a lure or spoon, a hook swingably connected with the lure or spoon, and an elastic member engageable with the lure or spoon and also the hook to releasably retain the hook up in striking position and allowing the hook to have a limited amount of lateral play with respect to the lure or spoon.

3. Artificial bait comprising the combination of a lure or spoon, a hook swingably connected with the lure or spoon, and an elastic member having one end thereof connected with the lure or spoon and extending rearwardly along the underside of the lure or spoon, and engaged with the rear extremity of the lure or spoon and also engaged with the shank of the hook to releasably retain the hook up in striking position and allowing the hook to have a limited amount of lateral play with respect to the lure or spoon.

4. Artificial bait comprising the combination of a lure or spoon, a hook swingably connected with the lure or spoon, an elastic member having one end thereof connected with the lure or spoon and extending rearwardly along the underside of the lure or spoon, and engaged with the rear extremity of the lure or spoon and also engaged with the shank of the hook to releasably retain the hook up in striking position and allowing the hook to have a limited amount of lateral play with respect to the lure or spoon, said elastic member having its rear terminal extended so as to cause the bait to wobble when drawn through the water.

5. Artificial bait comprising the combination of a lure, a hook swingably connected with said lure, a piece of soft elastic material connected at one end with said lure and engaged with said hook, said lure having a curved projection on the end thereof adjacent said hook, and said piece of material having provision for engaging said projection, whereby said hook may be releasably retained in a striking position with respect to said lure.

6. Artificial bait comprising the combination of a lure, a hook swingably connected with said lure, a piece of soft flat elastic material disposed flatwise with respect to said lure connected at one end with said lure and engaged with said hook, said lure having a curved projection on the end thereof adjacent said hook, and said piece of material having provision for engaging said projection, whereby said hook may be releasably retained in a striking position with respect to said lure.

7. Artificial bait comprising the combination of a metal lure provided with a bendable member on one end thereof so as to be disposed at the desired downward angle with respect to the lure, an eye on the lure at or near a central point thereof, a fish hook connected with said eye for swinging movement, an elastic member having holes therethrough whereby said elastic member may be connected at one end with said eye and engaged between its ends with said bendable member and also engaged with the shank of said hook, for the purpose of releasably retaining the hook up in striking position with respect to said lure.

8. A swivel connection for artificial bait comprising the combination of a lure having a longitudinal slot and a transverse slot communicating with the longitudinal slot thereby presenting lugs directly opposite each other in the plane of the lure, a swivel member having a head on one end and an attaching eye on the opposite end, plates arranged on opposite sides of the lure adjacent said lugs, said plates having ends through which the swivel member projects, certain of the ends of said plates being disposed in the transverse slot and engageable with said lugs to prevent endwise movement of the plates with respect to the lure, said longitudinal slot providing a clearance space for the swivel member.

9. Artificial bait comprising the combination of a lure or spoon, a hook swingably connected with the lure or spoon, and an elastic member connected at one end with the lure or spoon and connected near its opposite end with the hook and releasably engaged with one extremity of the lure or spoon to releasably retain the hook up in striking position with respect to the lure or spoon.

10. Artificial bait comprising the combination of a lure or spoon, a hook swingably connected with the lure or spoon, and a piece of soft elastic material connected at one end with the lure or spoon and connected near its opposite end with the hook and releasably engaged with one extremity of the lure or spoon to releasably retain the hook up in striking position with respect to the lure or spoon.

CHESTER A. BRAIDWOOD.